United States Patent
Drakoulis et al.

(10) Patent No.: US 7,095,866 B1
(45) Date of Patent: Aug. 22, 2006

(54) WIRELESS 900 MHZ BROADCAST LINK

(75) Inventors: Niko Drakoulis, Elmwood Park, IL (US); Ronald G. Pace, Naperville, IL (US); Michael K. Pedigo, Zionsville, IN (US); Russell A. Phillips, Lebanon, IN (US)

(73) Assignee: Akoo, Inc., Elmwood Park, IL (US)

( * ) Notice: Subject to any disclaimer, the term of this patent is extended or adjusted under 35 U.S.C. 154(b) by 736 days.

(21) Appl. No.: 09/903,166

(22) Filed: Jul. 11, 2001

(51) Int. Cl.
H04R 5/02 (2006.01)
H04M 1/00 (2006.01)
H04B 3/00 (2006.01)
H04B 7/00 (2006.01)
H04B 15/00 (2006.01)

(52) U.S. Cl. .............. 381/311; 381/77; 455/42; 455/555; 455/315

(58) Field of Classification Search ............. 381/77, 381/79, 42, 311; 455/42, 52, 555, 23, 165.1, 455/315
See application file for complete search history.

(56) References Cited

U.S. PATENT DOCUMENTS

| 5,272,525 A | 12/1993 | Borchardt et al. | 358/83 |
|---|---|---|---|
| 5,299,264 A | 3/1994 | Schotz et al. | 381/14 |
| 5,319,716 A | 6/1994 | McGreevy | 381/79 |
| 5,349,386 A | 9/1994 | Borchardt et al. | 348/485 |
| 5,410,735 A | 4/1995 | Borchardt et al. | 455/42 |
| 5,477,539 A | 12/1995 | Brown | 370/84 |
| 5,491,839 A | 2/1996 | Schotz | 455/66 |
| 5,581,617 A | 12/1996 | Schotz et al. | 381/14 |
| 5,619,582 A | 4/1997 | Oltman et al. | 381/82 |
| 5,666,658 A * | 9/1997 | Borchardt et al. | 455/42 |
| 5,768,696 A | 6/1998 | Law | 455/127 |
| 6,067,039 A | 5/2000 | Pyner et al. | 342/125 |
| 6,137,995 A | 10/2000 | Durec et al. | 455/75 |
| 6,215,981 B1 | 4/2001 | Borchardt et al. | 455/42 |
| 6,256,303 B1 * | 7/2001 | Drakoulis et al. | 370/344 |
| 6,922,555 B1 * | 7/2005 | Mohindra | 455/314 |
| 2003/0005138 A1 * | 1/2003 | Giffin et al. | 709/231 |

* cited by examiner

Primary Examiner—Vivian Chin
Assistant Examiner—Devona E Faulk
(74) Attorney, Agent, or Firm—Young & Basile, P.C.

(57) ABSTRACT

A high frequency signal transmission apparatus includes a transmitter for transmitting received signals from a signal source as a modulated signal on a high frequency 900 MHz carrier to a remote receiver. The remote receiver converts the high frequency carrier in at least one conversion step to a lower frequency carrier signal. The lower frequency carrier signal carrying the modulated signal is then converted to an audio output or to another carrier signal and retransmitted as a modulated second signal to another remote receiver capable of demodulating the signal and broadcasting the audio sounds or video images. The oscillators in the transmitter and receiver are selectable to operate at discrete frequencies. Automatic fine tuning control is provided in the receiver to accommodate drift of the oscillator in the receiver.

13 Claims, 8 Drawing Sheets

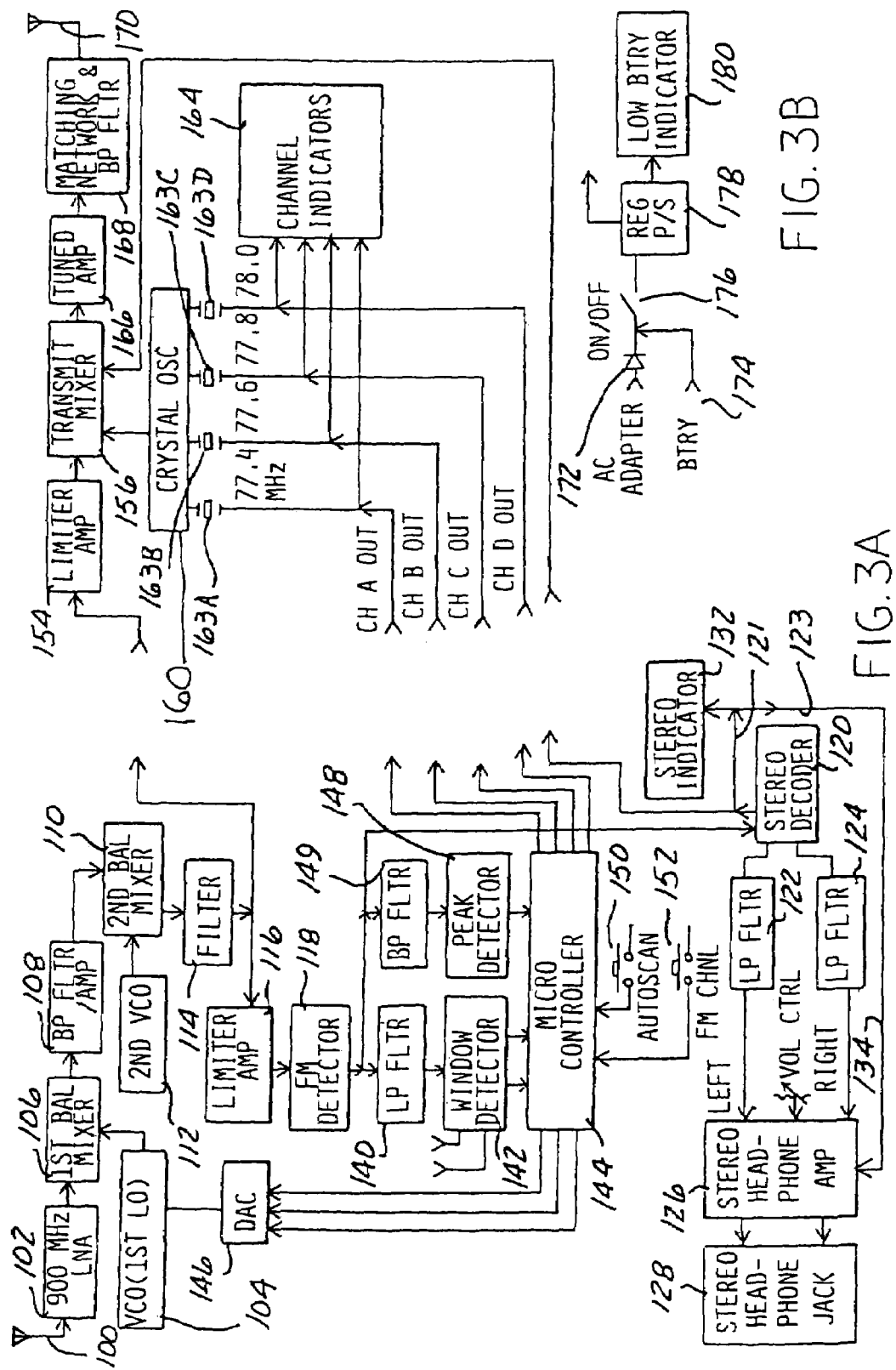

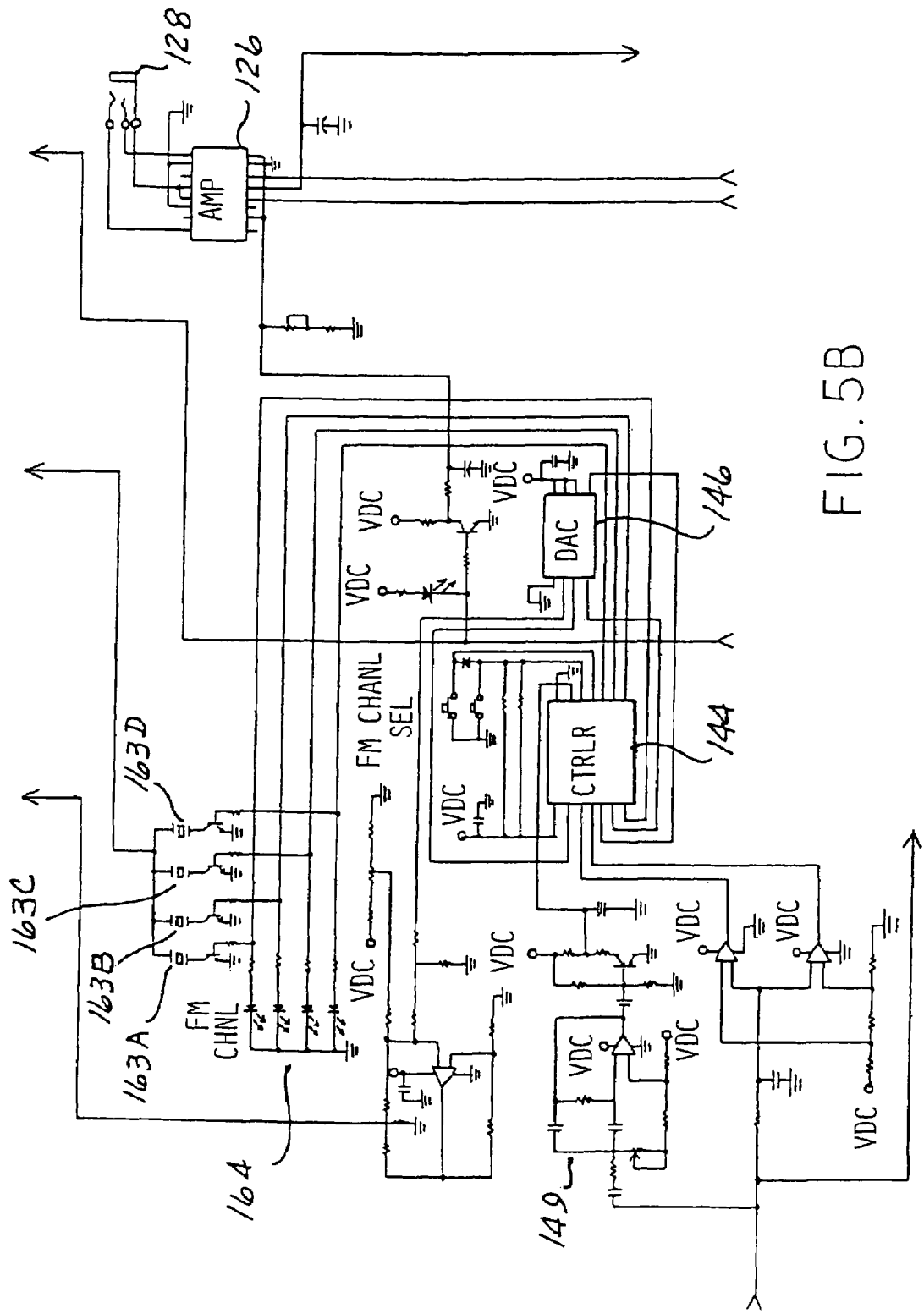

WIRELESS 900 MHZ BROADCAST LINK

BACKGROUND OF THE INVENTION

1. Field of the Invention

The present invention relates, in general, to wireless signal transmission systems and apparatus and, specifically, to wireless transmission system capable of transmitting audio or video signals in either analog or digital format via high frequency carrier signals in the 900 MHz or higher range.

2. Description of the Art

Various wireless audio and video signal transmission systems have been devised which transmit audio and/or video signals, such as television signals, radio signals, etc., by a wireless link from a signal source to a signal receiver or output device capable of converting the received signals to audio and/or video sounds.

Local wireless television transmission systems which transmit television or radio signals from a local source, such as a television, VCR, radio set or radio stereo receiver, frequently transmit such signals within a frequency band above 900 MHz and, preferably, within a frequency band of 902 MHz to 928 MHz. This frequency band is desirable because at higher carrier frequencies, the bandwidth of the transmitted signal occupies a smaller region of the transmission bandwidth than at lower carrier frequencies. This leaves more channels available for use and results in decreased RF interference and noise as well as greater flexibility in channel selection.

Many televisions and radio stations now include stereo audio signals in their transmissions. Thus, a wireless signal transmission apparatus must have a capability of transmitting stereo audio signals. Conventionally, stereo audio signals are transmitted by adding the right and left audio channels to form a first signal and subtracting the right and left channels to form a second signal which is modulated on a subcarrier of 38 KHz. The subcarrier is suppressed and the combination of the first signal, the subcarrier modulated second signal, and a 19 KHz pilot signal form a multiplexed stereo signal which modulates a carrier for transmission to a remote receiver. Conventional integrated circuits for producing such multiplexed stereo signals, known as stereo encoder circuits, are available commercially.

Such high frequency wireless transmission systems conventionally include a transmitter which is capable of transmitting television or radio mono or stereo signals to a remote receiver, both having appropriate antennas for transmitting and receiving the source signals as a modulated high frequency carrier. Heretofore, the remote receiver has been mounted in close proximity to or formed as a part of a signal output device, such as an AM/FM stereo receiver, television, for example. The distance or separation between the remote receiver antenna and the output device is relatively limited due to the low power level signals transmitted at the high carrier frequency. This small transmission range limits the use of additional speakers or an additional receiver and speakers which may not be located in the same general area as the first transmitter and the output device.

Audio and video signals are now available through the Internet typically in the form of streaming broadcast of radio or television programs, recorded music, etc. The audio and/or video signals are downloaded from the Internet signal source by a user's Internet service provider and input through a modem to the user's computer. The computer generates signals to an audio and/or video output card which then transmits analog output signals to speakers coupled to the computer or to a monitor for broadcast of the signals.

Frequently, however, the audio system or the monitor employed with a computer is not as sophisticated as the user's home stereo system or television. Further, a user's computer may not be located in the same room or area of a home as the multi-component stereo system or television.

Thus, it would be desirable to provide a wireless signal transmission apparatus which is capable of retransmitting high frequency audio and/or video signals modulated on a high frequency carrier by a first transmitter and transmitted wirelessly via the high frequency carrier to a remote receiver over an expanded transmission range as compared to previously devised high frequency transmission systems. It would also be desirable to provide a wireless high frequency signal transmission system which is capable of transmitting streaming broadcast signals from the Internet or any other audio and/or video source to a remote receiver.

SUMMARY OF THE INVENTION

The present invention is a signal transmission apparatus capable of transmitting audio and/or video signals from a suitable signal source via a high frequency (900 MHz) carrier to a remote receiver which downconverts the high frequency carrier signal to a lower frequency carrier signal which is demodulated to generate audio and/or video output.

According to one aspect of the present invention, the apparatus includes a first transmitter adapted to be coupled to the signal source for providing audio and/or video frequency signals in either analog or digital format. The signal source may be any source capable of generating audio signals, such as a sound generator circuit in a computer, a CD player, an AM/FM tuner or AM/FM stereo receiver, and/or video signals, such as a cable TV signal, VCR, satellite downlink, television broadcast, etc.

A first oscillator produces a high frequency carrier signal. Means are provided for combining the high frequency carrier signal with the audio and/or video frequency signals to form a first modulated signal transmitted by an antenna from the first transmitter.

A first receiver, remote from the first transmitter, is connected to an antenna for receiving the first modulated signal. Means are provided for downconverting the first modulated signal from the high frequency carrier signal of the first transmitter to a second modulated signal including a lower frequency carrier signal.

According to one aspect of the invention, the first selectable means are connected to the first oscillator to generating one of a plurality of discrete carrier frequency outputs from the first oscillator. Preferably, the oscillator output frequencies are in the 900 MHz range.

In another aspect, the first selectable means comprises means for inputting one of a plurality of discrete voltages to the first oscillator. These voltages may be, in one aspect of the invention, provided by user control of a multiposition switch on the base unit containing the first transmitter.

According to another aspect of the present invention, the second selectable means is coupled to the remote receiver for generating one of a plurality of discrete second carrier frequencies from a second oscillator coupled to the second transmitter.

In another aspect of the present invention, a second oscillator is coupled to the first receiver for converting the carrier frequency of the first modulated signal to a lower frequency carrier. The second selectable means further includes means for selecting one of a plurality of crystals, each enabling the second oscillator to oscillate at a discrete frequency.

According to the invention, the converting means further comprises means for converging the high frequency carrier signal of the first modulated signal received by the receiver to a lower carrier signal used in the second modulated signal. Preferably, the lower frequency signal is in the low end of the FM broadcast frequency band in the case of transmitted audio signals.

According to one aspect of the invention, the converting means preferably converts the high frequency carrier signal of the first modulated signal to the lower frequency carrier signal in two frequency steps.

According to one aspect of the present invention, the source comprises audio signals received through Internet communication from a remote audio source by a central processor. A sound generator circuit is coupled to the central processor for generating audio frequency signals from a central processor output. The audio frequency signals are supplied to the first transmitter. In addition, according to one aspect of the present invention, connectors or jacks may be provided on a housing containing the first transmitter to also supply the audio signals from the audio source to a pair of speakers.

According to another aspect of the present invention, the first receiver also includes automatic frequency control means. The automatic frequency control means includes means for generating an output upon detecting an audio or video signal from the first modulated signal. Means are responsive to the output of the detecting means for generating a signal proportional to the center of frequency of the converted lower frequency carrier signal. Means are also responsive to the signal proportional to the center of frequency for determining one of a high or low status of the detected center of frequency relative to a nominal center frequency. The means generating an output corresponding to the determined high or low status of the detected center frequency. A controller is responsive to the output for adjusting the frequency of the second oscillator until the output of the detector means is proportional to the nominal center frequency.

In yet another aspect of the present invention, a third oscillator is coupled to the first transmitter for generating a pilot carrier frequency signal. Means are provided for modulating the pilot carrier frequency signal with the audio signal and the high frequency carrier signal as the first modulated signal for transmission to the first receiver. Means are provided in the first receiver for detecting the pilot carrier frequency signal and generating an output upon detecting the pilot carrier frequency signal. The controller, in response to the absence of the pilot carrier frequency signal step wise advances the output frequency of the first oscillator until the pilot carrier frequency signal is detected.

In yet another aspect of the invention, a recorder is coupled to the demodulated output of the remote unit for receiving the audio and/or video signals received by the remote unit and storing said signals in a suitable recording media, such as a flash memory, etc. The recording media may also be an MP3 compatible storage and replay device, etc.

The recording means, upon activation, outputs the stored signals representing audio or visual media through the transmitter section of the remote unit for transmission in the frequency band associated with said signals to the end output device or receiver.

The wireless signal transmission apparatus of the present invention provides several unique features not found in previously devised high frequency carrier transmission systems, such as systems utilizing 900 MHz signal transmission.

The present apparatus also provides selectable channels in both the transmitter and the receiver to provide excellent signal quality without interference.

The present apparatus uniquely converts the high frequency carrier of the first modulated signal from the first transmitter to a lower frequency carrier used in the second modulated signal transmitted from a remote unit containing the first receiver to the further remote receiver without utilizing conventional demodulating and modulation of circuits. This improves the signal to noise quality of the transmitted signal while significantly reducing the cost of the apparatus since less expensive conversion circuits are employed rather than the higher cost modulation and demodulation circuits.

BRIEF DESCRIPTION OF THE DRAWING

The various features, advantages and other uses of the present invention will become more apparent by referring to the following detailed description and drawing in which:

FIGS. 3A and 3B are block diagrams of a remote receiver unit shown in FIG. 1 according to one aspect of the present invention;

FIGS. 5A, 5B, and 5C are detailed circuit diagrams of the receiver shown in FIGS. 3A and 3B.

DESCRIPTION OF PREFERRED EMBODIMENT

Figure 6:
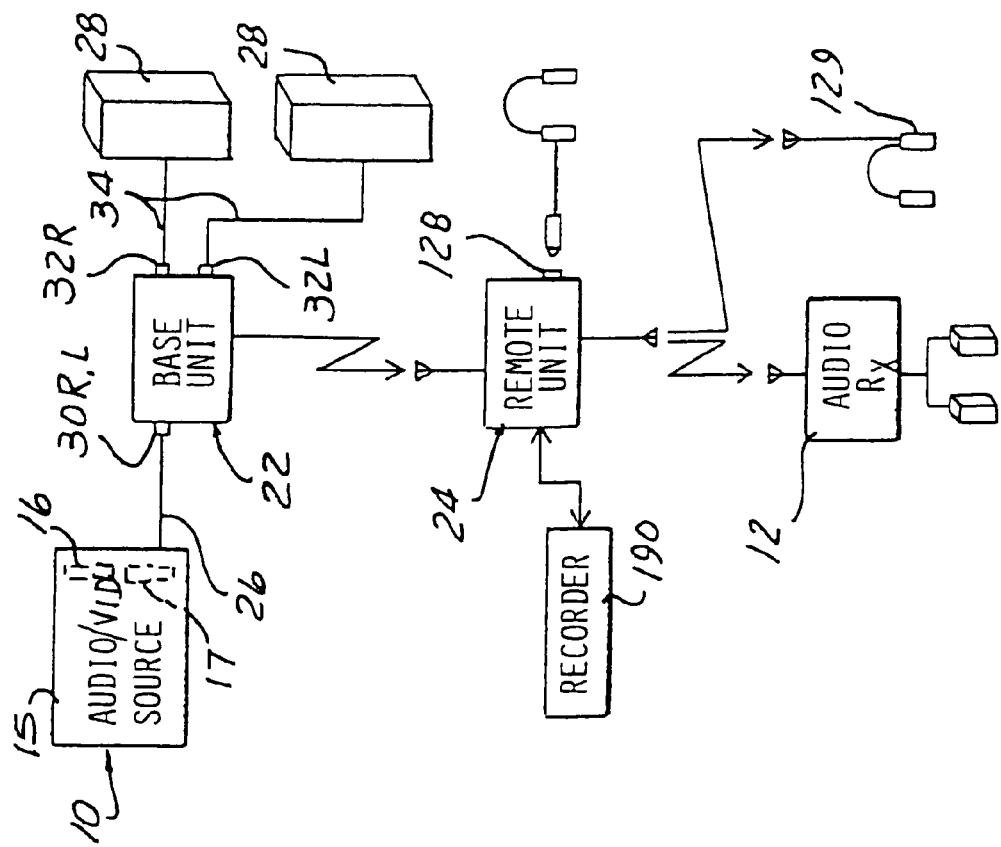
FIG. 6 is a block diagram of another embodiment of a wireless high frequency signal transmission apparatus according to the present invention having a recording media.

Referring now to the drawings, and to FIGS. 1–5C in particular, there is depicted a preferred aspect of the present invention which is described hereafter with reference to the transmission of audio stereo signals from an audio signal source 10 to a remote audio output device 12.

However, it will be understood that the following description of an audio signal embodiment of the inventive high frequency signal transmission apparatus is by example only as the present invention also encompasses the high frequency transmission of video signals and both analog and video signals in either analog or digital format. The source of video signals can include an Internet media broadcast, a cable television signal feed, a television broadcast, the output of a video cassette recorder, etc.

Although the audio source 10 is described hereafter as a computer connected via a modem, not shown, to the Internet for receiving and downloading music or other audio signals from a remote source via conventional Internet communication, the audio source 10 may be any suitable mono or stereo audio source which provides music, data, or verbal sounds. The audio source 10 may also be provided in different forms, other than the illustrated computer 14 and computer sound generator card 16. Examples of other audio sources 10 suitable for use in the present invention include conventional radio frequency transmitted audio signals from a television or radio broadcast antenna, a CD player, AM/FM tuner, tape deck, turntable, etc.

Figure 1:
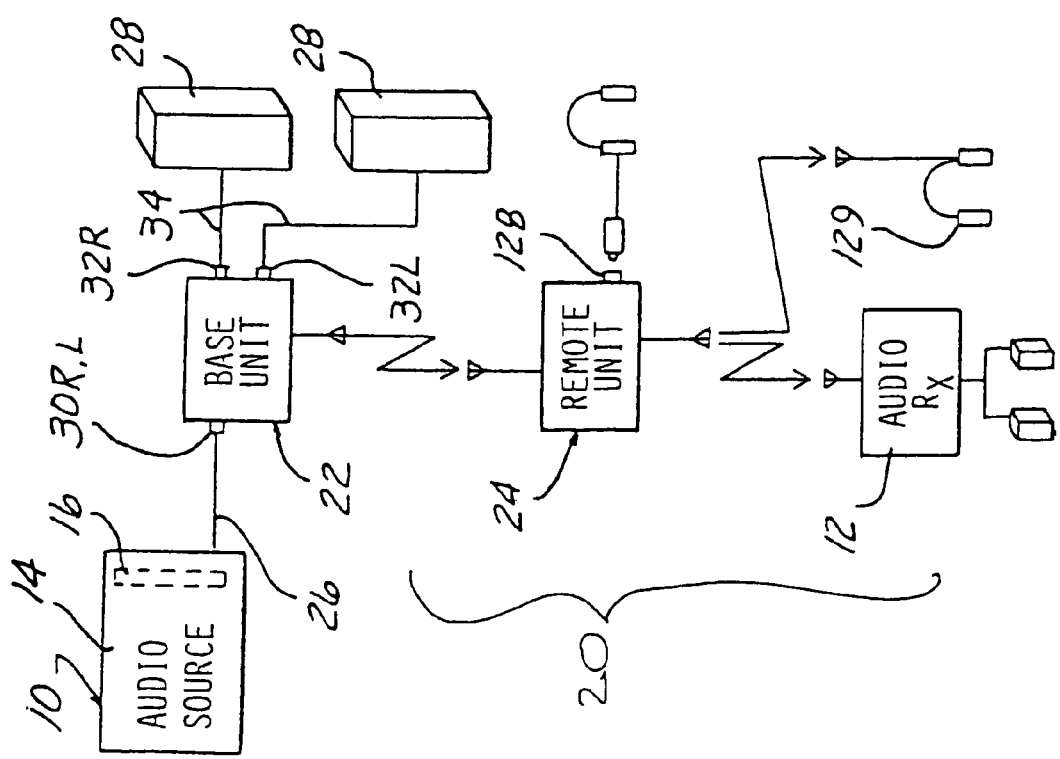
FIG. 1 is a block diagram of a wireless high frequency signal transmission apparatus according to the present invention.

A wireless signal transmission apparatus 20 of the present invention, as shown in FIG. 1, includes a base unit 22 containing a high frequency transmitter and a remote unit 24 which is capable of receiving the high frequency transmitted signal and then converting the modulated signal on a lower carrier frequency to an audio receiver or output device 12.

As shown in FIG. 1, the base unit 22 is adapted to be coupled via jacks or connectors and electrical conductors to the signal source 10, which, in this aspect of the invention, is described as being the computer 12. Appropriate output jacks on the computer 14 are connected to outputs on the internally mounted computer sound generating card 16 and receive plug-in connectors on electrical cables or conductors 26. The cables 26 would normally run as right and left channel cables to a speaker pair 28.

However, in using the apparatus 20 of the present invention, the conductors 26 are plugged into left and right connectors or jacks denoted symbolically by reference number 30 on a housing containing the circuitry and components of the base unit 22. Left and right audio in-jack 30, such as RCA audio in-jacks, are mounted on the base unit housing for receiving the cables 26. A separate power jack, not shown, is also mounted on the housing of the base unit 22.

The base unit 22 is also provided with a pair of left and right audio output jacks 32 only one of which is shown in FIG. 1. Conductors 34 with plugs matable with the jacks or connectors 32 are connected between the jacks 32 and the speaker pair 28 for generating audio sounds from the audio source 10 at the location of the audio source 10.

Although not shown, a stereo mini-input jack and stereo mini-output jack may also be mounted on the housing of the base unit 22 for receiving mini plug connectors attached to cables. A headphone jack may also be provided on the housing of the base unit 22 for connection to a portable receiver, such as a portable headphone.

Figure 2:
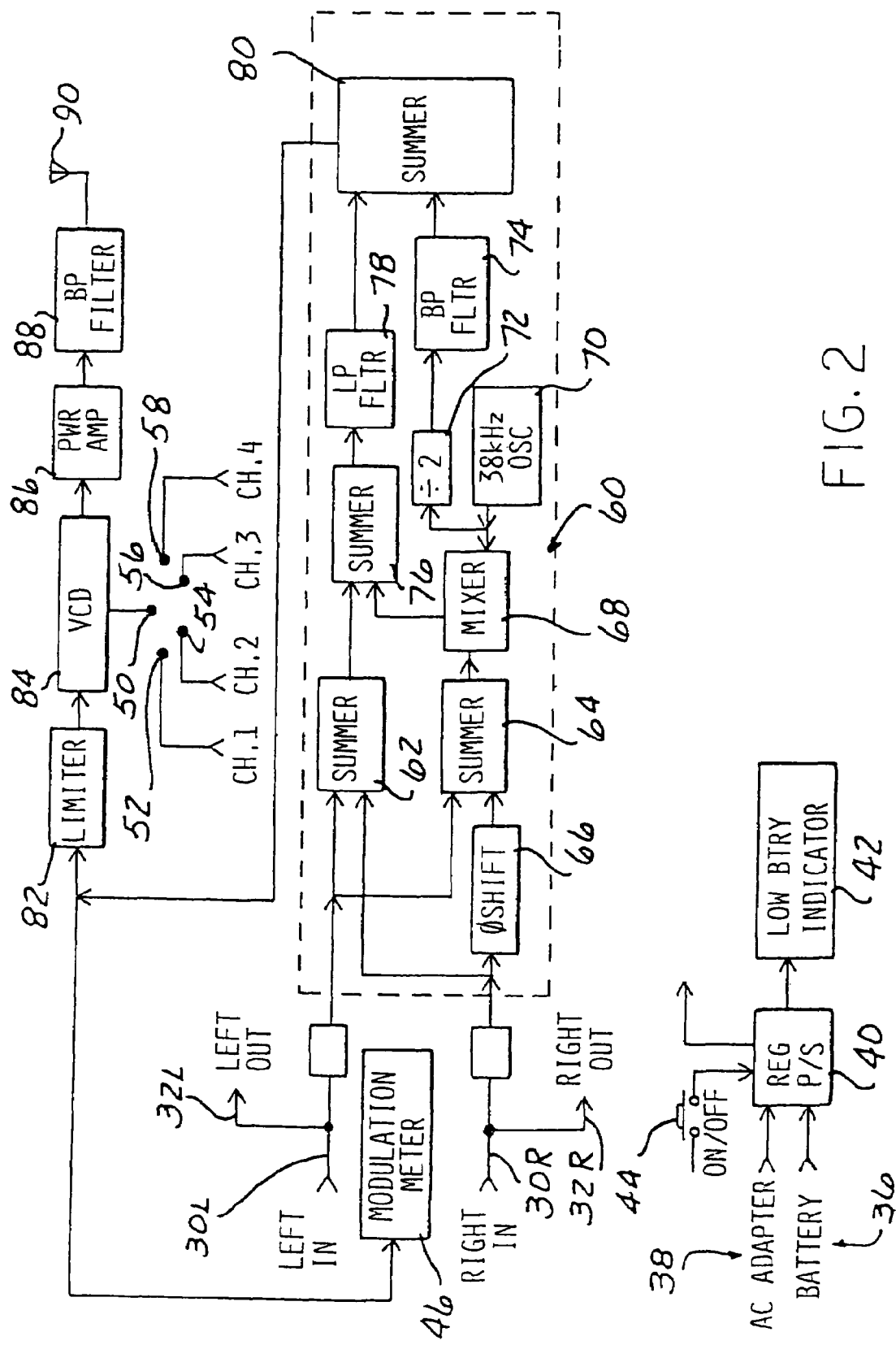
FIG. 2 is a block diagram of the base unit signal transmitter shown in FIG. 1 constructed in accordance with one aspect of the present invention.
Figure 4A:
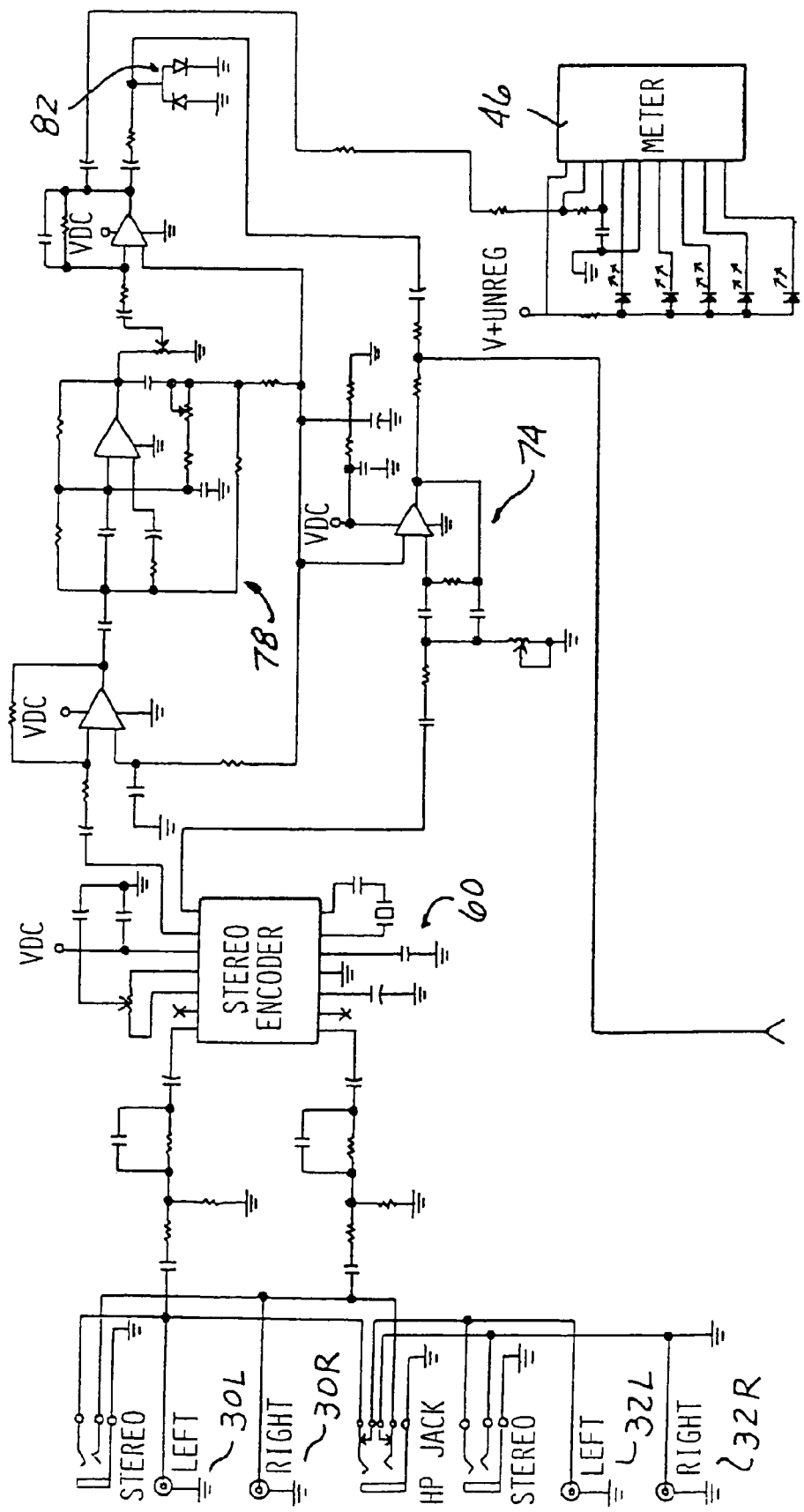
FIGS. 4A and 4B are detailed circuit diagrams of the transmitter shown in FIG. 2.
Figure 4B:
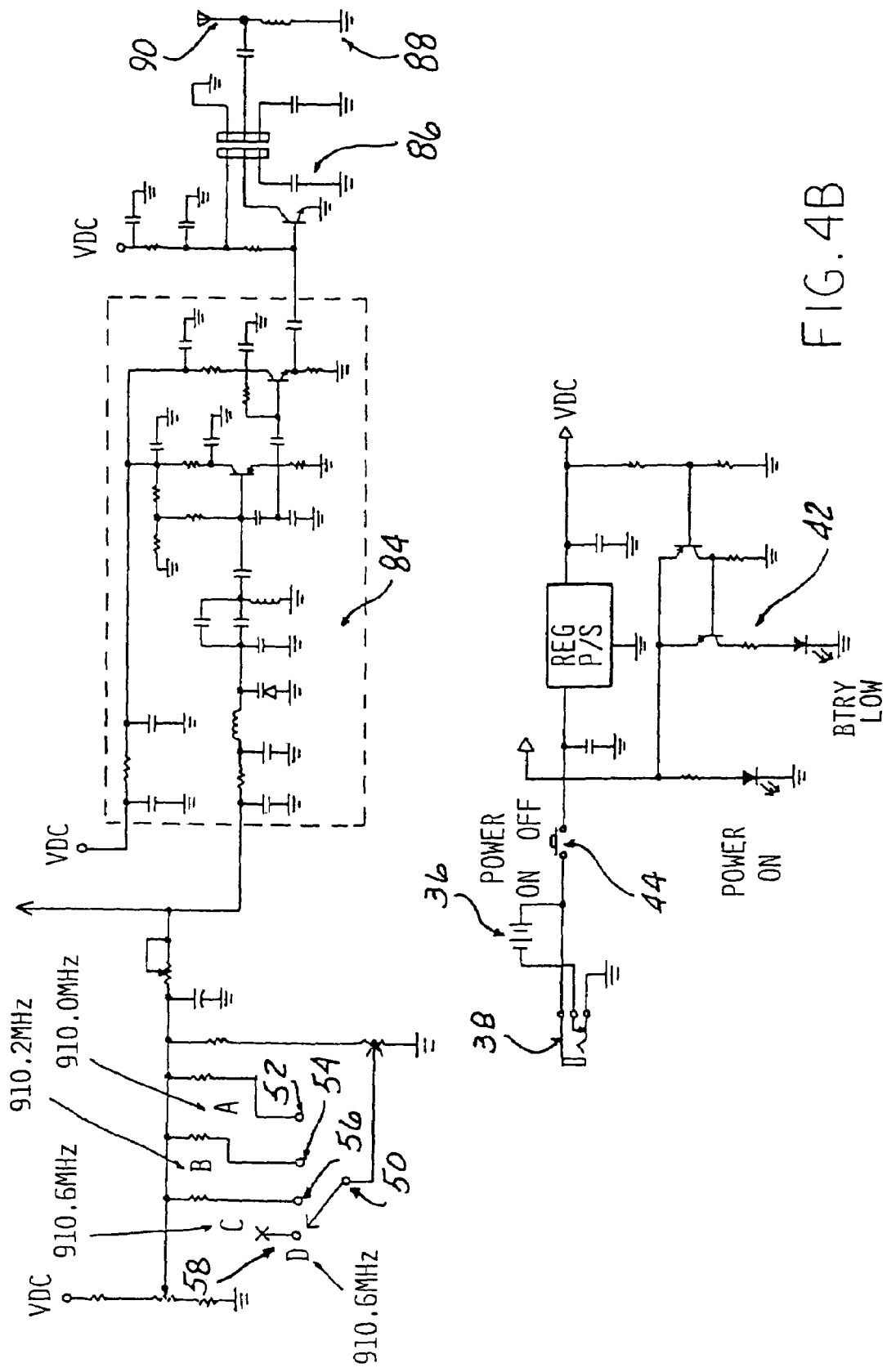

As shown in the block diagram of FIG. 2 and in detail in FIGS. 4A and 4B, the base unit 22 is provided with DC power from DC storage batteries 36 or by a conventional AC/DC adapter 38 which is plugged into a AC power source, such as a building AC outlet. The DC power from either the AC adapter 38 or the batteries 36 are input to a regulated power supply 40. A low battery indicator, such as an LED 42, is connected to the regulated power supply 40 and is illuminated when battery power falls below a predetermined threshold level sufficient for operation of the base unit 22.

An on/off pushbutton 44 is mounted on the housing of the base unit 22 for controlling the supply of power to the circuitry in the base unit 22.

A five LED level meter 46 is also mounted on the housing of the base unit 22 to indicate the modulation of the receiving signal level. The modulation meter 46 is driven by a sample of the left and right channel signals via the connectors 30R and 30L through a summing circuit 48. The user is able to adjust the modulation level by adjusting the volume of the audio sound produced by the computer sound generator card 16 until it is optimal, as indicated by the maximum number of illuminated LEDs on the modulation meter 46. Four green LEDs are provided for sequential illumination on increasing modulation level, with a red LED provided for a no signal indication.

Finally, a channel select switch 50, such as a slide switch or multi-position switch is switchable between four positions labeled Ch 1, Ch 2, Ch 3, and Ch 4. Each position has a red LED indicator 52, 54, 56, and 58, respectively, to indicate the selected channel.

The incoming left and right stereo signals on channels 30L and 30R are also passed to a stereo encoder circuit 60. The stereo encoder circuit may be a conventional stereo modulator IC, such as one sold by New Japan Radio Co, Ltd., model no. NJM2035. Although other types of stereo encoder circuits may also be employed, the circuit 60 generally combines the left and right channel signals into a standard composite stereo format. A summing circuit 62 adds the left and right channel signals into a first signal. Another summing circuit 64 forms a second signal by subtracting the right and left channel signals, with the right channel signal phase shifted 180° from the left channel signal by a phase shift circuit 66. The output of the summing circuit 64 is input to a balanced mixer 68 which has another input from a 38 KHz crystal oscillator 70. The mixer 68 modulates the subtraction product of the summing circuit 64 onto a 38 KHz subcarrier frequency.

The 38 KHz output of the crystal oscillator 70 is halved by a divide by 2 circuit 72 to form a 19 KHz subcarrier frequency. This signal is passed through a 19 KHz bandpass filter 74 to produce a 19 KHz pilot signal. The output of the balanced mixer 68 is summed with the output of the summing circuit 62 in a summing circuit 76. The output of the summing circuit 76 is passed through a low pass filter 78 and input to a summing circuit 80 to produce a multiplexed stereo signal. The output of the summing circuit 80 is processed by a limiter or automatic gain control circuit 82 and used to frequency modulate a first oscillator 84 which is preferably a 900 MHz voltage controlled oscillator (VCO).

A channel select switch 50 having multiple positions is used to determine the center transmit frequency of the oscillator 84. Each channel of the channel select switch 50 is connected to a discrete voltage thereby controlling the output frequency of the first oscillator 84. For example, when Ch 1 is selected by the channel select switch 50, the first oscillator 84 outputs a center frequency of 910.0 MHz. Channels 2, 3, and 4 (Ch 2, Ch 3, and Ch 4), when individually selected by the channel switch 50, respectively control the first oscillator 84 to output a transmit center frequency of 910.2, 910.4, and 910.6 MHz, respectively.

The output of the first oscillator 84 is amplified to an appropriate level by an RF power amplifier 86 and filtered in a 900 MHz bandpass filter 88 to remove harmonics before passing to an antenna 90 for transmission to the remote unit 24.

The output signal from the first oscillator 84 is impedance matched with the antenna 90 which may be a ¼ wave resonant monopole antenna tuned to the desired output frequency (900 MHz or above). The antenna 90, which is preferably permanently attached to the housing of the base unit 22, radiates modulated high frequency radio waves at the selected 910.0–910.6 frequency to the remote unit 24.

Although the above-identified circuitry which performs the function of the base unit 22 has been described as being a stand alone device separate from the audio source 10, it will be understood that the circuitry or components employed in the base unit 22 may also be mounted on the sound generator card 16 in a computer comprising the audio source in the present example of the invention as well as on a separate circuit board mounted within the computer housing or on a computer motherboard itself.

Figure 5A:
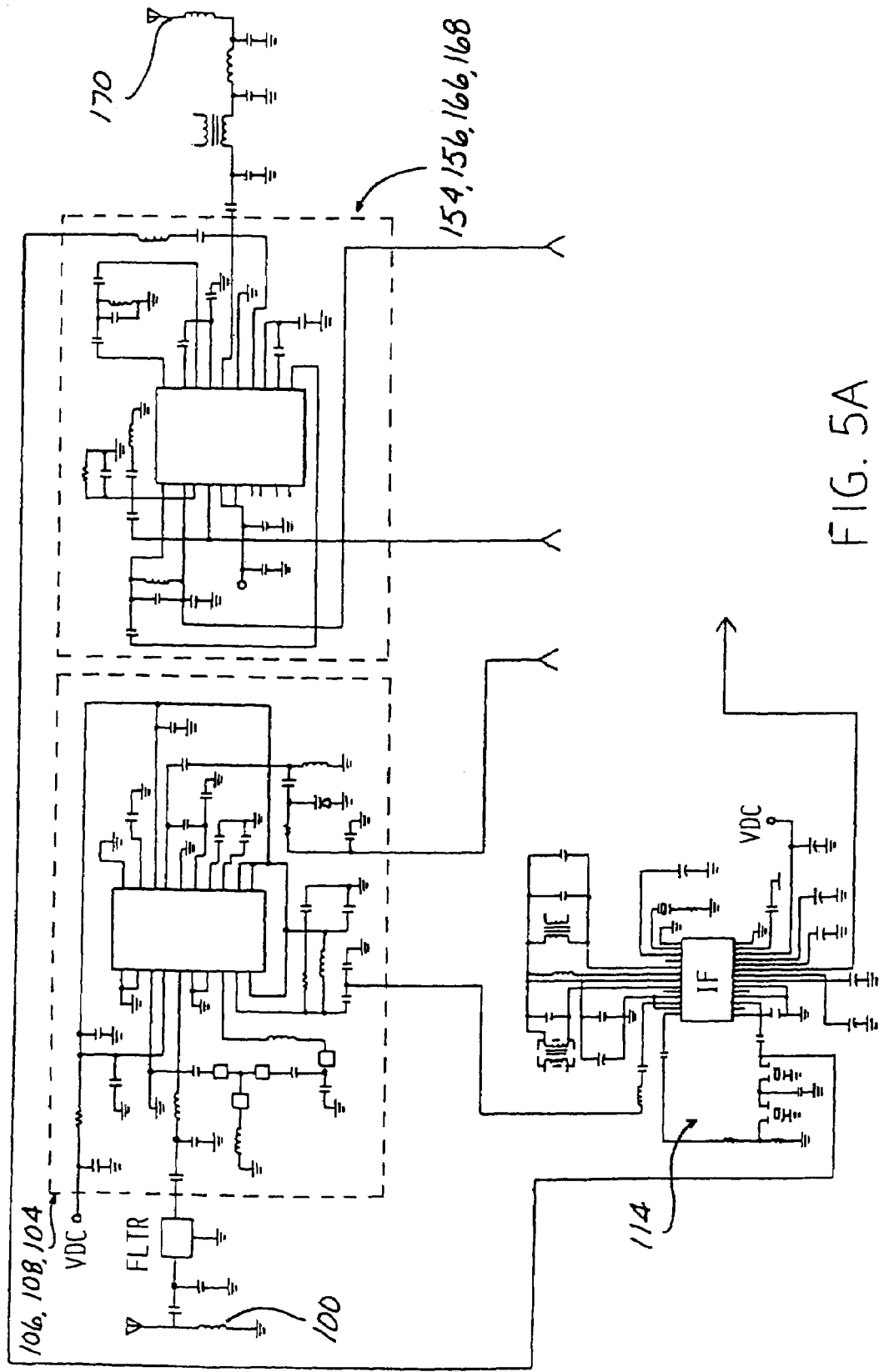
Figure 5C:
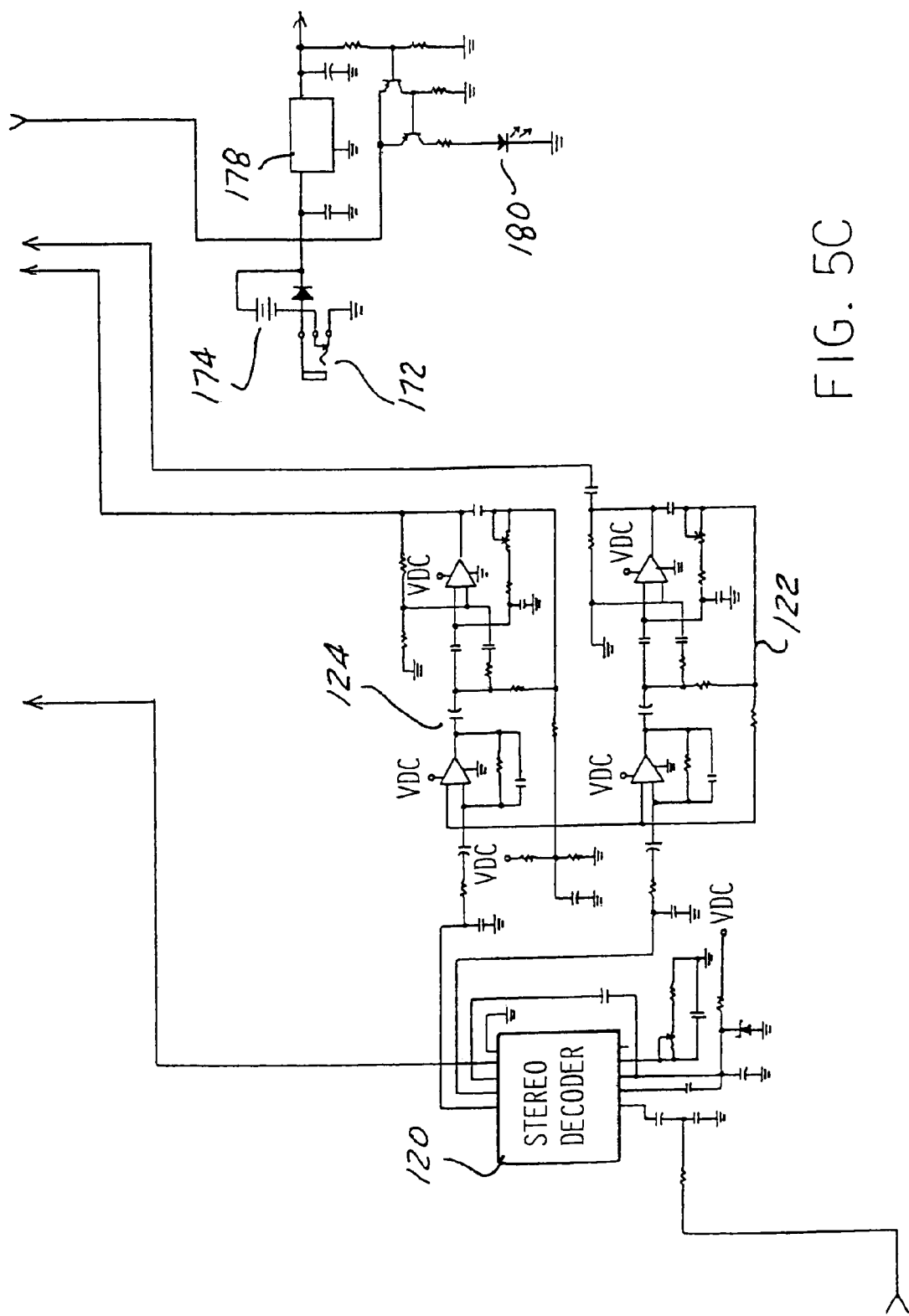

Referring now to FIGS. 3A and 3B and to the detailed schematics of FIGS. 5A, 5B and 5C, the 900 MHz modulated ISM band signal from the base unit 22 is picked up at the remote unit 24 by an antenna 100. The antenna 100 may also be a ¼ wave resonant monopole fixed to the housing of the receiver 24. Other antenna types may also be employed for the antenna 100.

The 900 MHz modulated signal received by the antenna 100 is amplified by a low-noise RF amplifier 102. The output of the amplifier 102 is combined with the output of a first local oscillator 104 in a first balanced mixer circuit 106. The first mixer 106 provides two outputs, namely, the sum and the difference of the two input frequencies. The sum signal is attenuated by a 61 MHz bandpass filter and amplifier circuit 108. The filter and amplifier circuit 108 amplifies and passes the difference frequency of 61 MHz to a second balanced mixer 110.

The first oscillator 104 is preferably a digitally tuned voltage control oscillator (VCO). The first oscillator 104 is made to oscillate at a frequency that is 61 MHz above the received frequency. For example, if the received frequency is 905 MHz, the first oscillator operates at a frequency of 966 MHz.

The amplified and filtered output of the first oscillator 104, which is now at 61 MHz, is mixed with the output of a second local oscillator 112 tuned to a 71.7 MHz frequency in the second balanced mixer 110. Again, the second balanced mixer 110 produces sum and difference outputs. The sum frequency of 132.7 MHz (in the present example) is attenuated by a 10.7 MHz ceramic filter 114; while a difference frequency 10.7 MHz is passed through the ceramic bandpass filter 114 as a 10.7 MHz carrier frequency.

The 10.7 MHz signal still maintains the audio frequency modulation that was transmitted by the base unit 22. The signal has been simply "mixed down" from the 900 MHz ISM band to 10.7 MHz. This conversion from the 900 MHz frequency to a 10.7 MHz frequency avoids the use of modulation and demodulation circuits which impose imperfections into the transmitted signal. Converting the center transmit frequency rather than modulating and demodulating as in previous high frequency signal transmission systems utilizes less expensive retransmission circuitry thereby reducing the cost of the signal transmission device as well as providing better signal quality.

After passing through the ceramic filter 114, the 10.7 MHz modulated carrier signal is routed through a limiter amplifier 116 which not only provides substantial gain, but also removes variations in the amplitude of the carrier signal. Coupled to the output of the limiter amplifier 116 is a quadrature-type FM frequency detector 118 which produces a voltage that is proportional to the frequency of the 10.7 MHz carrier signal. Specifically, the output voltage of the FM detector 118 is proportional to the composite stereo FM modulation that was applied to the 900 MHz signal in the base unit 22.

To recover the left and right channel stereo signals for output to an audio output device, such as a stereo headphone jack mounted on the housing of the remote unit 24, as described hereafter, separate speaker, etc. the output of the FM detector 118 is processed by a stereo decoder or integrated circuit 120, such as a PLL FM multiplex demodulator sold by Sanyo as model no. LA3335M. The individual left and right audio signals from the stereo decoder 120 each pass through a separate 19 KHz low pass notch filter 122 and 124, respectively, in order to remove 19 KHz "pilot tone" used in decoding the composite stereo signal. Finally, the left and right audio signals pass through an amplifier 126 for output to the output device or stereo headphone jack 128 mounted on the housing of the remote unit 24. The amplifier 126, in the preferred aspect of the present invention, employs an electronic volume control that enables the gain of both left and right channels to be adjusted with a separate volume control switch or knob 130 mounted on the remote unit 24.

The stereo decoder 120 also has an output 121 that indicates successful detection of the 19 KHz pilot tone sent by the base unit 22. This output is used to operate an indicator or LED 132 which works as a "stereo" or "valid signal received" indicator. If the pilot tone is not successfully decoded, an output 123 from the stereo decoder 120 is used to disable the transmitter of the remote unit 24 and mute the headphone audio output via a mute signal 134 coupled to the stereo headphone amplifier 126. The remote transmitter and the headphones 129 return to normal operation once the pilot signal is successfully decoded or received.

The output of the FM detector 118, as shown in FIG. 3A, is also used for automatic frequency control (AFC). By running the output of the FM detector 118 through a low pass filter 140, a signal is obtained that is proportional to the "center frequency" of the 10.7 MHz carrier signal. If the first and/or second oscillator 104 and 112 drift off frequency, the 10.7 MHz signal will also be different from the 10.7 MHz center frequency. By determining the filtered or average FM detector output from the low pass filter 140, it is possible to determine if the detected 10.7 MHz signal frequency is too high or too low. This is accomplished in a window detector circuit 142 which compares the filtered FM detector output from the filter 140 with two reference voltages Vref1 and Vref2. Vref1 being slightly lower than nominal frequency and Vref2 being slightly higher than nominal frequency. The window detector circuit 142 has two outputs that can be decoded to indicate whether the input voltage is below the lower reference frequency (Vref1), above the upper reference frequency (Vref2), or in the window "in between" the lower reference frequency and the upper reference frequency.

A controller or microcontroller 144 executes a stored program to accomplish this decoding. The microcontroller 144 outputs signals to a eight bit digital to analog converter 146 which is used to tune or adjust the frequency of the first local oscillator 104. The controller 144 is programmed to make corrections to the frequency of the first local oscillator 104 as indicated by the decoded window detector 142 output information. The objective is to maintain the output of the second mixer 110 at exactly 10.7 MHz. When the remote unit 24 is first powered up, the controller 144 linearly increments the frequency of the first local oscillator 104 until the output of the second mixer 110 is exactly 10.7 MHz as indicated by the output of the window detector 142. After that, the software control program executed by the controller 144 simply maintains the frequency by incrementing up or decrementing down the magnitude of control signals supplied to the digital to analog converter 146 as indicated by the decoded output of the window detector 142.

Since the window detector 142 is only useful within a certain neighborhood of the desired frequency, another detector 148 is also required for operation elsewhere. This other detector 148 is preferably a 19 KHz peak detector 148 which receives the output of the FM detector from a 19 KHz bandpass filter 149. If the first and second local oscillators 104 and 112 are off frequency by a large amount, as indicated by a failure to detect the 19 KHz pilot tone sent by the base unit 22, the controller 144 will simply start tuning the first local oscillator 104 up in frequency until the 19 KHz pilot tone is detected by the detector 148. Once the pilot tone is detected, the controller 144 looks at the outputs of the window detector 142 to determine if the frequency is too far off and, if so, which direction the first local oscillator 104 must be tuned in order to correct the frequency. It should be noted that if the first local oscillator 104 is adjusted to the upper limit of a tuning range without locking onto the pilot tone signal, the first local oscillator 104 will simple wrap around and start ramping up from its lowest tunable frequency.

A pushbutton 150 labeled "AUTOSCAN" is optionally connected as an input to the controller 144. The pushbutton 150 allows the operator to force a new "AUTOSCAN" when the microcontroller 144 increments the frequency of the first local oscillator 104 to fine tune the output frequency of the second balanced mixer 110 to the center 10.7 MHz frequency. However, this push button 150 should seldom need to be used since the automatic fine tuning control circuit described above insures that the remote unit 24 will find the transmitted center frequency automatically.

The 10.7 MHz signal output from the filter 114 still maintains the stereo frequency modulation that was transmitted by the base unit 22. The stereo frequency modulation has simply been "mixed down" or "converted down" from the 900 MHz band to 10.7 MHz. Transmitter circuitry, described hereafter, in the remote unit 24 amplifies this modulated 10.7 MHz signal, mixes it back up to the low end of the FM broadcast band, amplifies and filters it.

This output can be transmitted or re-broadcasted to another audio output device 12, such as a RF receiver.

The transmitter portion of the remote unit 24 includes a high gain limiter amplifier filter 154 tuned to 10.7 MHz. The limiting action of the limiter amplifier 154 has the effect of making the transmitter output level largely independent of the strength of the signal received on the 900 MHz band.

The limited 10.7 MHz signal is next mixed in a balanced transmit mixer 156 with the output of a second oscillator 160. Preferably, the second oscillator 160 is a crystal oscillator designed to operate at one of four difference frequencies as selected by the controller 144 via an input pushbutton 162 operated by the user. In response to each press of the pushbutton 162, the controller 144 outputs signals on channel output lines selecting one of four difference crystals which are switched into the second oscillator 160 to make it operate 10.7 MHz below of the available low end FM broadcast band frequencies of 88.1, 88.3, 88.5, and 88.7 MHz. Individual FM band channel indicators 164, such as LEDs, are coupled to each channel output line from the controller 144 to indicate the selected channel.

The output of the transmit mixer 156 includes once again of sum and difference outputs. This time, however, the sum term is of interest. For example, if the desired transmit channel is 88.1 MHz, the operator selects the appropriate crystal, i.e., 77.4 MHz, by an appropriate number of separate depressions or the channel pushbutton 162 until the desired transmit channel corresponding to 77.4 MHz as shown by one output LED 164 is reached. The difference term output from the transmit mixer 156 is attenuated by a tuned 88 MHz amplifier while the sum term output is amplified. This 88.1 modulated MHz signal is then passed through a bandpass filter antenna matching network circuit 168 and applied to an FM broadcast band transmit antenna 170. This signal which is broadcast at the low end of the FM broadcast band (88 MHz) can be received using any standard FM broadcast band receiver (mono or stereo). If the receiver is a stereo receiver, it will reproduce the stereo program material. By way of example, the audio receiver or output device 12, shown in FIG. 1, which is capable of receiving the re-broadcasted transmit signal from the antenna 170 may be a conventional AM/FM stereo receiver, AM/FM radio or even a wireless headphone having demodulation circuitry mounted therein, similar to that described above for the stereo decoder 120 and headphone jack 128 mounted on the housing of the remote unit 24.

As also shown in FIG. 3B, electrical power to the remote unit 24 is provided through a conventional AC/DC adapter 172 or conventional storage batteries 174. An on/off switch 176 is also mounted on the housing of the remote unit 24 to control the application of power to a regulated power supply 178 mounted within the housing of the remote unit 24. A low battery indicator, such as a LED indicator 180, is also mounted on the housing of the remote unit 24 to indicate when the battery level falls below a predetermined threshold sufficient for proper operation of the remote unit 24.

Although the above description of the construction and operation of the base unit 22 and the remote unit 24 has been for the high frequency transmission and frequency down-conversion of audio signals, it will be understood that the apparatus of the present invention with minimal alteration may also be utilized to transmit high frequency digital signals. For example, regardless of the signal format from the audio source 10, the audio signals, whether in analog or digital form, are modulated onto the high frequency carrier signal and transmitted to the remote unit 24. In the remote unit 24, the incoming modulated signal can be retransmitted to the remote output device in one of two forms, namely, either in analog or digital format depending upon the nature of the output device.

If the output device, such as a television or AM/FM stereo receiver, is capable of receiving and demodulating digital signals, then the modulated digital signals received by the remote unit 24 can be merely transmitted at the new carrier frequency in the same manner as the incoming audio signal described above. If, however, the output device is capable of only generating audio signals from analog input, and the incoming modulated signals received by the remote unit 24 are in digital format, a digital to analog converter or codec can be employed, for example, between the output of the 61 MHz bandpass filter/amplifier 108 and the second balanced mixer 110 in the remote unit 24. In this manner, the digital signals are converted to analog form, but remain as a modulated signal on the new down converted frequency which is then up converted and retransmitted by the remote unit 24 to the further remote output device as described above. Conversely, if the output device is only capable of generating output from digital input, a reverse or analog to digital converter or code may be employed in the remote unit 24 to convert the incoming digital modulated signals to analog modulated signals.

Further, although audio signals have been described above as forming the output of the source 10, the apparatus of the present invention is also capable of transmitting video signals via high frequency signal transmission in essentially the same manner as that described above. Video signals are typically in MASS. standard format and may have stereo audio accompaniment. For video signals, the video signals are transmitted on a 2.4 GAZ. carrier with the audio signals transmitted on a 38 MHz subcarrier to the remote unit 24 from and audio/video source 15 in FIG. 6 through a sound generator circuit 16 and a video generator circuit 17.

The video signals are down converted by the remote unit 24 to a frequency band consistent with television or video broadcast format and then retransmitted to an output video device, such as a television, monitor, etc.

Referring now to FIG. 6, there is depicted another aspect of the present invention which includes a recording media or recorder 190. The recorder 190 may be any suitable recording device capable of receiving, storing and re-outputting digital and/or analog signals representing either audio or visual source programs or data. For example, the recorder 190 may constitute a conventional video cassette recorder for storing video and audio signals in analog form. Alternately, the recorder 190 may be a digital memory device such as, for example, a Rio-MP3 minidisc player manufactured by Diamond Multimedia. The only change necessary to the remote unit 24 is the addition of an analog to digital converter or code coupled to the output of stereo decoder 120 for converting audio signals to digital format. Of course, if the input signal stream is in digital format, the code is not required. Alternately, the analog to digital conversion may take place directly in the recorder 190.

The recorder 190 is also capable of outputting stored signals to the remote unit 24 upon receiving an input from a user, such as via a depression of a pushbutton or switch on the recorder 190 or remote unit 24 or upon receiving a signal from a remote source, such as the user's service provider assuming that a suitable Internet connection is made to either the recorder 190 or remote unit 24. Once activated, the recorder 190 outputs the stored signal information to the remote unit 24 which then reconstitutes the signals as analog or digital signals depending upon the nature of the output device and modulates the signals via the second mixer 110 at a suitable subcarrier frequency such as 10.7 MHz subcarrier frequency for audio signals or at a 2.4 GAZ. frequency, using a different second oscillator, for video signals. In the case of combined video and audio signals, the audio signals are transmitted on a lower frequency subcarrier, such as 38 MHz frequency, with the higher frequency video modulated signals. This signal stream is then transmitted through the transmitter section of the remote unit 24, in the same manner as described above and shown in FIG. 3B for audio signals, to the remote end device which has the capability to demodulate the received signals and generate appropriate video images and/or audio sounds.

It will also be understood that although the remote unit 24 and the recorder 190 are depicted as separate elements in FIG. 6, the circuitry and elements of both the remote unit 24 and the recorder 190 may be combined into a single device, such as a modified remote unit having an internally mounted recorder.

In summary, there has been disclosed a unique wireless high frequency signal transmission apparatus capable of receiving audio and/or video signals from a suitable source, transmitting the received signals via a high frequency carrier to a remote receiver which in turn converts the modulated signals to a different frequency for output to a local audio device or, alternately, retransmitting the modulated signals to a remote receiver capable of receiving and outputting the audio sounds or video images. The unique wireless transmission system of the present invention makes use of high frequency (900 MHz) carrier for transmissions to the remote unit and lower frequencies for transmissions from the remote unit to the end receiver. The present apparatus also provides multiple channel selection of both the high frequency and low frequency transmission signals thereby ensuring proper transmission of the signals despite any interference.

The high frequency transmission apparatus of the present invention makes unique use of a wireless connection between the remote unit and a further remote receiver thereby enabling the apparatus of the present invention to be employed in a completely different area of a building or home from the remote receiver. The apparatus of the present invention is also ideally suited for receiving streaming Internet broadcast media signals and then applying the signals through the remote unit to a remote receiver which typically can be a user's stereo system, a pair of wireless headphones containing appropriate stereo demodulation circuitry a television, etc.

What is claimed is:

1. A wireless signal transmission apparatus for use with a signal source providing first frequency signals, the signal transmission apparatus comprising:
   a first transmitter adapted to be coupled to a signal source for receiving first frequency signals, the first transmitter connected to an antenna;
   a first oscillator in the first transmitter producing a high frequency carrier signal;
   means for combining the high frequency carrier signal with the first frequency signals to form a first modulated signal transmitted by the antenna;
   a first receiver remote from the first transmitter connected to an antenna for receiving the first modulated signal; and
   means coupled to the first receiver for converting the first modulated signal from the high frequency carrier signal of the first transmitter to a second modulated signal including a lower frequency carrier signal and the first frequency signal;
   the first receiver including:
   a second oscillator coupled to the first receiver for converting the carrier frequency of the first modulated signal to a lower frequency carrier signal;
   frequency control means including:
   means for generating an output upon detecting a first frequency signal in the first modulated signal;
   means, responsive to the output of the detecting means, for generating a signal proportional to the center frequency of the converted lower frequency carrier signal;
   means, responsive to the signal proportional to the center frequency, for determining one of a high or low status of the detected center frequency relative to a nominal center frequency, the means generating an output corresponding to the determined one of the high or low status of the detected center frequency; and
   a controller, responsive to the output for adjusting the frequency of the second oscillator until the output, of the detector means is proportional to the nominal center frequency.

2. The apparatus of claim 1 further comprising:
   first selectable means, connected to the first oscillator, for generating one of a plurality of discrete carrier frequencies of at least 900 MHz.

3. The apparatus of claim 2 wherein the first selectable means comprises means for inputting one of a plurality of discrete voltages to the first oscillator.

4. The apparatus of claim 2 further comprising:
   means for modulating the first frequency signal with the selected carrier frequency of the first oscillator to form the first modulated signal.

5. The apparatus of claim 1 further comprising:
   a third oscillator coupled to the first transmitter for generating a pilot carrier frequency signal;
   means for modulating the pilot carrier frequency signal with the first frequency signal and the high frequency carrier signal into the first modulated signal for transmission by the first transmitter to the first receiver;
   means, in the first receiver, for detecting the pilot carrier frequency signal and generating an output upon detecting the pilot carrier frequency signal; and the controller, in response to the absence of the pilot carrier frequency signal, step-wise advancing the output frequency of the first oscillator until the pilot carrier frequency signal is detected.

6. The apparatus of claim 5 further comprising:
a second oscillator coupled to the first receiver for converting the carrier frequency of the first modulated signal to a lower frequency carrier signal.

7. The apparatus of claim 6 wherein the second selectable means comprises:
means for selecting one of a plurality of crystals, each enabling the second oscillator to oscillate at a discrete frequency.

8. The apparatus of claim 1 wherein the signal source comprises a computer generated audio signal stream.

9. The apparatus of claim 1 wherein the signal source comprises at least one of a CD player, RF audio receiver, AM/FM tuner, and AM/FM stereo receiver.

10. A wireless signal transmission apparatus for use with a signal source providing first frequency signals, the signal transmission apparatus comprising:
a first transmitter adapted to be coupled to a signal source for receiving first frequency signals, the first transmitter connected to an antenna;
a first oscillator in the first transmitter producing a high frequency carrier signal;
means for combining the high frequency carrier signal with the first frequency signals to form a first modulated signal transmitted by the antenna;
a first receiver remote from the first transmitter connected to an antenna for receiving the first modulated signal; and
means coupled to the first receiver for converting the first modulated signal from the high frequency carrier signal of the first transmitter to a second modulated signal including a lower frequency carrier signal and the first frequency signal;
the signal source providing streaming media signals received through Internet communication from a signal source by a central processor, including at least one of a sound generator circuit coupled to the central processor for generating audio frequency signals from a central processor output, and a video generator circuit coupled to the central processor for generating video images from a central processor output.

11. The apparatus of claim 1 further comprising:
recording means, coupled to the converting means for recording the first frequency signal, the recording means further including means for outputting the stored first frequency signal to the converting means for transmission by a second transmitter.

12. The apparatus of claim 1 wherein the converting means comprises:
first converting means for converting the high frequency carrier signal to a first converted carrier signal having a frequency below the FM broadcast frequency band; and
second converting means, responsive to the first converting means, for converting the first converted carrier signal to a second converted carrier frequency different from the first converted carrier signal.

13. The apparatus of claim 12 wherein:
the frequency of the first converted carrier signal is about 10.7 MHz; and
the frequency of the second converted carrier signal is below the low end of the FM broadcast frequency band.

* * * * *